US008365188B2

(12) United States Patent
Goldspink et al.

(10) Patent No.: US 8,365,188 B2
(45) Date of Patent: Jan. 29, 2013

(54) CONTENT MANAGEMENT

(75) Inventors: Lincoln M V Goldspink, Southampton (GB); Malcolm J Duckett, Medstead (GB)

(73) Assignee: Speed-Trap.com Limited, Newbury, Berkshire (GB)

(*) Notice: Subject to any disclaimer, the term of this patent is extended or adjusted under 35 U.S.C. 154(b) by 1092 days.

(21) Appl. No.: 12/293,479

(22) PCT Filed: Mar. 13, 2007

(86) PCT No.: PCT/GB2007/000880
§ 371 (c)(1),
(2), (4) Date: Sep. 18, 2008

(87) PCT Pub. No.: WO2007/107702
PCT Pub. Date: Sep. 27, 2007

(65) Prior Publication Data
US 2009/0064173 A1    Mar. 5, 2009

(30) Foreign Application Priority Data
Mar. 20, 2006   (GB) .................................. 0605578.4

(51) Int. Cl.
*G06F 9/44* (2006.01)
(52) U.S. Cl. ..................... 719/311; 719/313; 719/320
(58) Field of Classification Search ................. 719/310, 719/311, 313, 320
See application file for complete search history.

(56) References Cited

U.S. PATENT DOCUMENTS

| | | | |
|---|---|---|---|
| 5,948,061 A * | 9/1999 | Merriman et al. ............ 709/219 |
| 6,085,224 A * | 7/2000 | Wagner .......................... 709/203 |
| 6,374,359 B1 * | 4/2002 | Shrader et al. .................... 726/5 |
| 6,401,125 B1 * | 6/2002 | Makarios et al. ............. 709/229 |
| 6,405,214 B1 | 6/2002 | Meade, II |
| 6,973,580 B1 * | 12/2005 | Carroll et al. ...................... 726/4 |
| 7,139,799 B2 * | 11/2006 | Qian et al. ..................... 709/205 |
| 2002/0032731 A1 * | 3/2002 | Qian et al. ..................... 709/204 |

(Continued)

FOREIGN PATENT DOCUMENTS

| | | |
|---|---|---|
| EP | 1 724 992 | 11/2006 |
| GB | 2 383 505 | 6/2003 |

(Continued)

OTHER PUBLICATIONS

International Search Report for PCT/GB2007/000880, mailed May 30, 2007.
Written Opinion of the International Searching Authority for PCT/GB2007/000880, mailed May 30, 2007.
European Search Report for GB Application No. 0605578, dated Jan. 19, 2007.

(Continued)

*Primary Examiner* — Van Nguyen
(74) *Attorney, Agent, or Firm* — Nixon & Vanderhye PC

(57) ABSTRACT

Tailored pages are received within a browser running on a client device. Pages from a page server are browsed and the browser sends from an active page to a monitoring server, at least one monitoring message including information concerning at least one of: interactions with and performance of at least one page browsed within the browser running on the client device. A control message is received in the active page, from the monitoring server including an instruction to generate a cookie within the browser including selected monitoring information. The cookie is generated within the browser and a message is sent to the page server, which message includes the cookie including the selected monitoring information. From the page server, at least one page content item is received that has been selected in dependence on the selected monitoring information included in the cookie.

26 Claims, 5 Drawing Sheets

U.S. PATENT DOCUMENTS

| | | | |
|---|---|---|---|
| 2002/0147570 A1* | 10/2002 | Kraft et al. | 702/186 |
| 2002/0184363 A1* | 12/2002 | Viavant et al. | 709/224 |
| 2004/0015580 A1* | 1/2004 | Lu et al. | 709/224 |
| 2004/0088363 A1 | 5/2004 | Doemling et al. | |
| 2005/0050159 A1* | 3/2005 | Suraski | 709/217 |

FOREIGN PATENT DOCUMENTS

| | | |
|---|---|---|
| WO | 01/69386 | 9/2001 |
| WO | 01/69412 | 9/2001 |
| WO | 02/44869 | 6/2002 |

OTHER PUBLICATIONS

Fenstermacher, K. D. et al., "Mining Client-Side Activity for Personalization", Proceedings of the 4th IEEE International Workshop on Advanced Issues of E-Commerce and Web-Based Information Systems, pp. 191-198, (Jun. 26, 2002).

Eirinaki, M. et al., "Web Mining for Web Personalization", ACM Transactions on Internet Technology, vol. 3, pp. 1-27, (Feb. 2003).

* cited by examiner

CONTENT MANAGEMENT

This application is the U.S. national phase of International Application No. PCT/GB2007/000880, filed 13 Mar. 2007, which designated the U.S. and claims priority to Great Britain Application No. 0605578.4, filed 20 Mar. 2006, the entire contents of each of which are hereby incorporated by reference.

BACKGROUND

1. Technical Field

This invention relates to website content management, in particular to methods and apparatus for communicating information concerning visitor behavior to content management systems to allow the content to be controlled in dependence on current behavior.

2. Related Art

There has been a long standing desire to provide personalized websites to enhance customer experience. This demands that the web content server constructing the pages being viewed by the visitor (a content management system or "CMS") is able to select content that is appropriate to that visitor. To be really effective this process needs real time information on the behavior or status of the user.

It is also recognized that the best way of evaluating and analyzing visitor behavior is by the collection of real time information from the client environment by "web analytic" or "e-business intelligence systems" and the analysis of this information to extract significant behavior or changes in status. This may be behavior or status changes occurring within the current session or life cycle information computed for the current visitor (for example recency—how recently the user visited the site previously, frequency—the regularity with which the user visits the site, latency—the average time between visits, etc.). A system which provides such a combination of functions can be described as a behavioral analysis system or "BAS".

Traditionally, the integration of CMS and BAS systems to provide effective relevant real time customization has been complex and expensive to implement.

BRIEF SUMMARY

It is an object of the exemplary embodiments to provide apparatus and methods which provide a technical basis for achieving such integration.

According to a first aspect of the present exemplary embodiments, there is provided a method for receiving tailored pages within a browser running on a client device, the method comprising the steps of:
browsing, in the browser, pages from a page server;
sending from an active page in the browser to a monitoring server, at least one monitoring message including information concerning at least one of: interactions with and performance of at least one page browsed within the browser running on the respective client device;
receiving in the active page, from the monitoring server, a control message including an instruction to generate a cookie within the browser including selected monitoring information;
generating said cookie within the browser;
sending a message to the page server, which message includes said cookie including the respective selected monitoring information; and
receiving from the page server, at least one page content item selected in dependence on the selected monitoring information included in the cookie.

Before the sending at least one monitoring message step, the method may comprise the step of the browser receiving a page from the page server that includes an instruction that causes the page to send a message to the monitoring sever. The message may comprise a request for a page component. The message may comprise the monitoring message.

According to a second aspect of the present exemplary embodiments, there is provided a client device arranged under the control of software for receiving tailored pages within a browser running on the client device, the device being arranged to:
browse, in the browser, pages from a page server;
send from an active page in the browser to a monitoring server, at least one monitoring message including information concerning at least one of: interactions with and performance of at least one page browsed within the browser running on the respective client device;
receive in the active page, from the monitoring server, a control message including an instruction to generate a cookie within the browser including selected monitoring information;
generate said cookie within the browser;
send a message to the page server, which message includes said cookie including the respective selected monitoring information; and
receive from the page server, at least one page content item selected in dependence on the selected monitoring information included in the cookie.

According to another aspect of the present exemplary embodiments, there is provided a method for providing pages with tailored content to browsers running on client devices comprising the steps of:
receiving at a monitoring server, from browsers running on client devices, monitoring messages including information concerning at least one of:
interactions with and performance of at least one page browsed within the browser running on the respective client device;
determining selected monitoring information based on the monitoring messages received at the monitoring server;
sending from the monitoring server, to active pages in the browsers, respective control messages including an instruction to generate a cookie within the browser including the respective selected monitoring information determined in the determining step;
receiving at a page server, the cookies generated by the browsers including the respective selected monitoring information; and
providing to the respective browsers at least one page content item selected in dependence on the selected monitoring information extracted from the respective cookie.

According to an additional aspect of the present exemplary embodiments, there is provided a system for providing pages with tailored content to browsers running on client devices, the system comprising a page server and a monitoring server and being arranged under the control of software to:
receive at the monitoring server, from browsers running on client devices, monitoring messages including information concerning at least one of:
interactions with and performance of at least one page browsed within the browser running on the respective client device;
determine selected monitoring information based on the monitoring messages received at the monitoring server;

send from the monitoring server, to active pages in the browsers, respective control messages including an instruction to generate a cookie within the browser including the respective selected monitoring information;

receive at the page server, cookies generated by the browsers including the respective selected monitoring information; and provide to the respective browsers at least one page content item selected in dependence on the selected monitoring information extracted from the respective cookie.

According to a further aspect of the present exemplary embodiments, there is provided a system for providing pages with tailored content to browsers running on client devices, the system comprising a page tailoring system and a monitoring system;

the monitoring system comprising a receive module for receiving, from browsers running on client devices, monitoring messages including information concerning at least one of: interactions with and performance of at least one page browsed within the browser running on the respective client device;

the monitoring system comprising a determination module for determining selected monitoring information based on the monitoring messages received at the monitoring system;

the monitoring system comprising a send module for sending, to active pages in the browsers, respective control messages including an instruction to generate a cookie within the browser including the respective selected monitoring information;

the page tailoring system comprising a receive module for receiving cookies generated by the browsers including the respective selected monitoring information; and the page tailoring system comprising a tailoring module for selecting for supply to the respective browsers at least one page content item selected in dependence on the respective selected monitoring information.

According to another aspect of the present exemplary embodiments, there is provided a method for setting first party cookies including monitoring information in browsers running on client devices comprising the steps of:

receiving at a monitoring system, from browsers running on client devices, monitoring messages including information concerning at least one of:

interactions with and performance of at least one page browsed within the browser running on the respective client device;

determining at the monitoring system selected monitoring information based on the monitoring messages received at the monitoring system;

sending from the monitoring system, to active pages in the browsers, respective control messages including an instruction to generate a cookie within the browser including the respective selected monitoring information determined in the determining step.

According to yet another aspect of the present exemplary embodiments, there is provided a method for providing pages with tailored content to a browser running on a client device comprising the steps of:

receiving at a monitoring server, from a browser running on a client device, at least one monitoring message including information concerning at least one of:

interactions with and performance of at least one page browsed within the browser running on the client device;

determining selected monitoring information based on the monitoring message received at the monitoring server;

sending from the monitoring server, to an active page in the browser, a control message including an instruction to generate a cookie within the browser including the selected monitoring information determined in the determining step;

receiving at a page server, the cookie generated by the browser including the selected monitoring information; and providing to the browser at least one page content item selected in dependence on the selected monitoring information extracted from the cookie.

Each of the methods above, where context allows, may comprise the further steps, before the above steps, of receiving, at the monitoring server, requests for page components from pages being browsed within the browsers and sending, from the monitoring server, page components in response to those requests, which page components are arranged to cause the pages being browsed to send the monitoring messages.

Each of the messages referred to above may be HTTP messages, for example HTTP requests.

In each case referred to above a plurality of cookies may be generated by each page. That is to say there may be messages that include instructions to generate more than one cookie, and/or there may be a plurality of messages each including an instruction to generate one of a number of cookies.

Generally the page server will be in a different domain than the monitoring server. However using the technique of sending messages including instructions (typically HTTP messages including script—for example JavaScript or Visual Basic Script) to generate first party cookies within the page allows communication between the monitoring sever (which is in the "wrong" domain) and the page server which by definition is in the domain of the page being monitored and/or to be tailored.

The behavior monitored and the precise nature of the monitoring information to be included in the cookie is not restricted by the current technique and is a matter for the monitoring techniques used. Similarly, the type of tailoring used is not restricted by the current technique and is a matter for the tailoring techniques used.

Thus, the present exemplary embodiments provide a simple mechanism by which a content management system (a page server/page tailoring system) can be passed indications of the current status or current behavior of a visitor browsing the site in real time by a behavioral analysis system (monitoring server/system). This can allow the content management system to select appropriate content to be displayed to the visitor to influence or respond to their behavior or status.

The present exemplary embodiments make use of first party cookies to provide a means of communication between the content management system and behavioral analysis system even though the behavioral analysis system is not necessarily a first party system. That is to say communication via first party cookies occurs even though the behavioral analysis system is not necessarily in the same domain as the content management system which is providing the web pages to the user.

The present exemplary embodiments may give various advantages:

1. The exemplary system requires no back-end integration with existing customer analysis systems.

2. Most content management systems commonly use first party cookies to retain or signal visitor status between the pages or sections of a site it is managing and this can facilitate implementation of the current exemplary embodiments.

3. The ability to deploy behavioral analysis systems in domains other than that of the website being browsed e.g., as an apparent third party) allows solutions to be provided in an application service provider model where the behavioral analysis system is not known or operated by the website owner.

The current exemplary embodiments are not limited to use with PCs acting as the client device, but are suitable for use with any systems which have client devices running browsers which are able to browse web pages and make use of HTTP or a similar protocol which encompasses the concept of cookies.

Embodiments of the present invention will now be described, by way of example only, with reference to the accompanying drawings in which:

FIG. 1 schematically shows architecture which may be used in methods and/or systems for providing tailored web pages;

Figure 1:
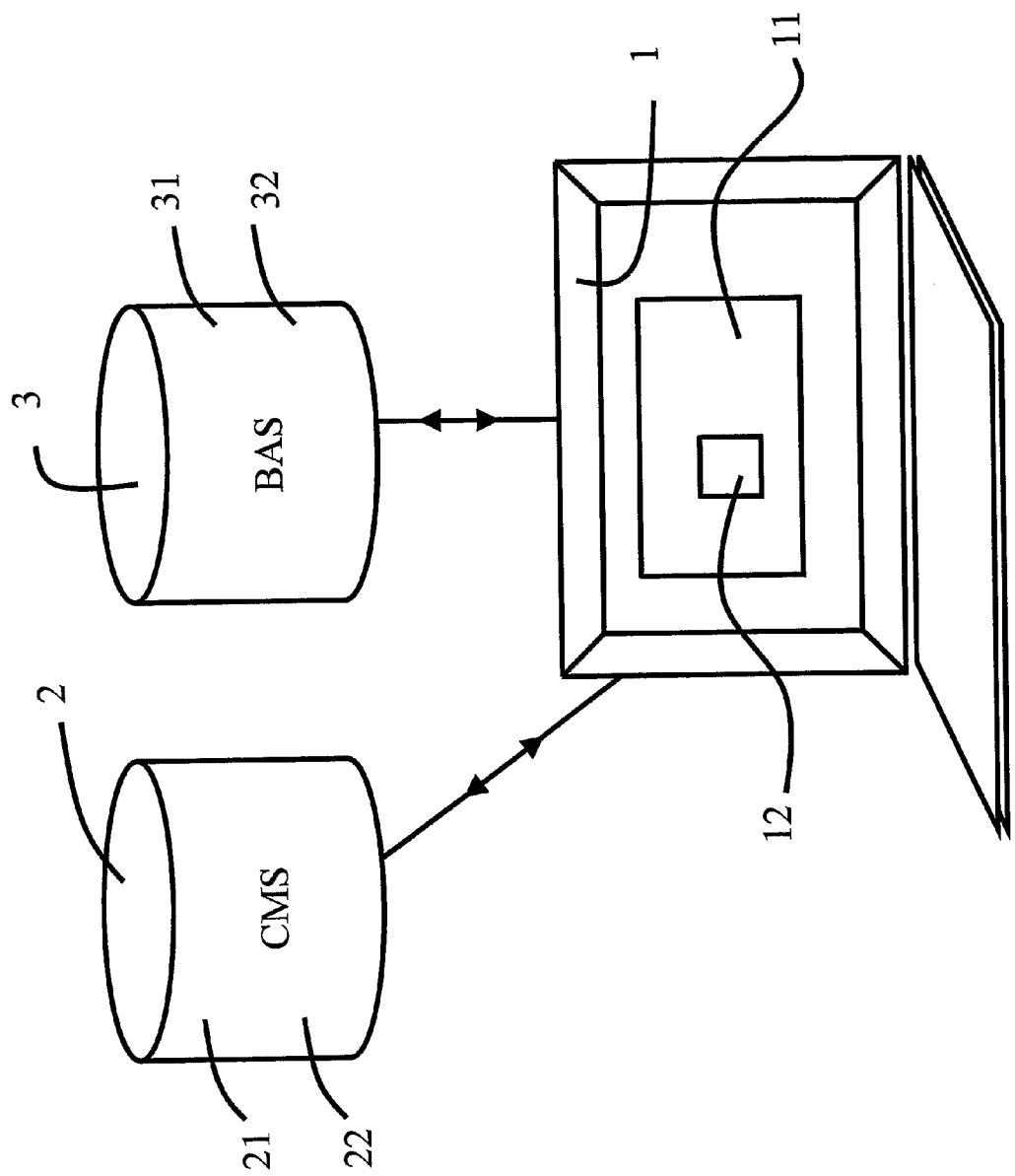

FIG. 1 schematically shows architecture which may be used in a method and/or system for providing web pages having tailored content.

DETAILED DESCRIPTION OF EXEMPLARY EMBODIMENTS

The exemplary architecture comprises a client device 1 which in this instance is a PC being used by a user to browse web pages. The client device 1 operates under the control of software and runs a browser 11 for viewing web pages 12 in a conventional way over the internet.

A content management system 2 including a page server 21 is provided for supplying web pages to requesting client devices 1. In the architecture shown in FIG. 1 there is only a single client device 1 shown, but it will be appreciated that in practice there may be many client devices 1 each accessing web pages from the content management system 2. The content management system 2 is arranged to not only supply static or generic web pages to the client device 1, but also to provide pages having content which is tailored to the client device and/or user.

The content management system therefore comprises a server for tailoring web page content, this may be the page server 21, or a separate server 22 within the content management system 2.

The architecture also comprises a behavioral analysis system 3 which again is connected to the internet and may communicate with the client device 1. The behavioral analysis system 3 comprises a monitoring server 31 which is used for gathering monitoring information concerning the user's interaction with pages 12 running within the browser 11 on the client device 1.

To a large degree, this monitoring operation is conventional and will make use of client side page tagging techniques. Such client side page tagging techniques, in themselves, are well understood and one such technique has been used for some time by the applicants. An early version of this technique is explained in detail in the Applicant's earlier applications WO01/69412 and WO01/69386. In such techniques, it is now typical to put some script (for example, Java Script or Visual Basic Script) within a selection or each and every page of a web site. As each page is visited, this script causes there to be communication with a server responsible for the collection of events describing users' journeys/interactions with the website and managing any necessary interactions with the client. In the present exemplary architecture, it is the behavioral analysis system 3 which comprises a server responsible for the collection of monitoring events.

In the present exemplary system and method, as will be described in more detail below, the behavioral analysis system 3 is arranged to analyze monitoring information from the interactions which go on at the client device 1 and under certain circumstances to identify selected monitoring information which it is considered may be useful for the customer management system 2 in determining which tailored content to provide to the client device 1. The analysis may be carried out by the monitoring server 31 or by a separate server 32 of the behavioral analysis system.

Where there is monitoring information which is determined would be useful to the content management system 2, this is communicated from the behavioral analysis system 3 to the content management system 2 by the mechanism of the behavioral analysis system 3 sending a message to a page 12 running within the browser 11 on the client device 1 containing an instruction to generate a cookie which includes the monitoring information. As this cookie is generated within the page 12 which was supplied by the content management system server 2, the cookie is a first party cookie within that domain. This means that once the cookie has been generated within the browser 11, then when there is further communication between the client device 1 and the content management system 2, the cookie will be included in the HTTP messages which are sent from the client device 1 to the content management system 2. Thus, the monitoring information identified by the behavioral analysis system 3 as being potentially useful for providing tailored content to the client device 1/user will be delivered to the content management system 2. There it can be used to determine the content which is provided to the client device 1/user by virtue of supplying a new page 12 to the client device 1 and/or supplying particular page components/content to the client device 1.

The exact behavior which is required to trigger the behavior analysis system 3 into sending monitoring information to the content management system 2 via the technique described above is a matter of design choice. There is basically little or no limit to the types of behavior which may be monitored and acted upon and similarly there is little or no limit to the type of data/information which can be communicated from the behavior analysis system 3 to the content management system 2. There will, however, typically be practical limit on the volume of data which can be transmitted via this technique due to the volume of data which can be transmitted by setting one or more cookies, i.e., by the allowed data size for cookies.

The following are examples of the monitoring information that could be included in a first party cookie set on the client device 1 in response to scripts sent by the behavior analysis system 3:

High value customer not visited for several months, high defection potential.

Customer who has failed to successfully complete a registration form on more than two occasions within the current session.

A customer whose behavior suggests that they are engaged in fraudulent activity.

When cookies containing such information are received by the content management system 2, the action carried out is of course dependent on the set-up of the content management system 2. Again the present techniques provide little or no limitations on what actions may be carried out at that time. That is a matter for the set-up of the content management system 2.

However, by way of example, in response to information being received via the cookie that the customer is a high value customer that has not visited for several months the content management system 2 could deliver a new page 12 to the client device 1 or a page component to the existing page 12 offering the customer a special offer, money off if an order is placed, or a questionnaire requesting the user's input on what they need from the system or so on.

On the other hand, if the message in the cookie suggests that the user is engaged in fraudulent activity, this could be used to block access to certain information or block certain functionality usually available via that website.

Figure 2:
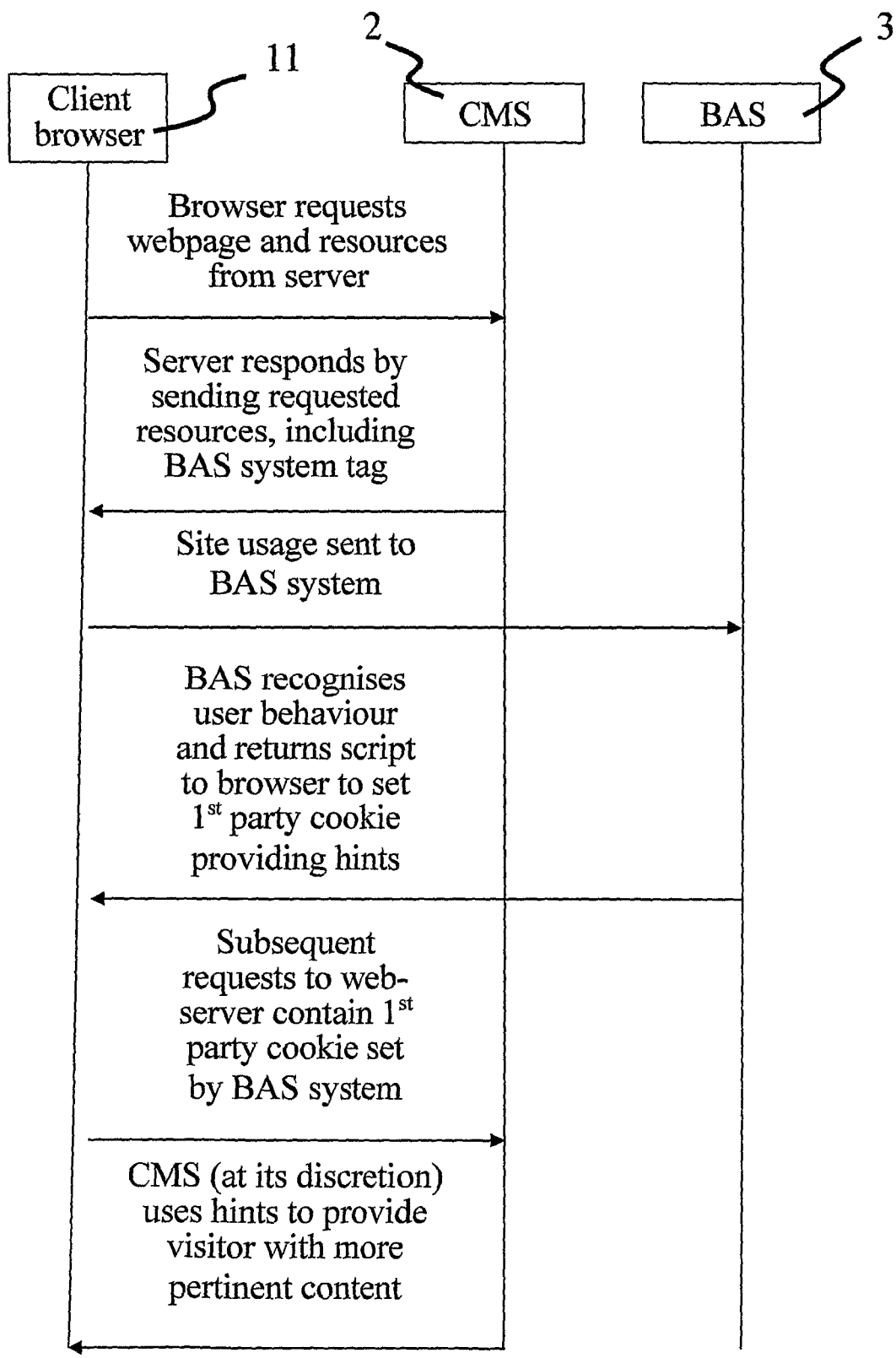
FIG. 2 shows a sequence diagram of client/server interactions in the operation of methods and/or systems for providing tailored web pages.

FIG. 2 shows a sequence diagram for client/server interactions between the client device 1, the content management system 2 and the behavior analysis system 3.

First the browser requests a web page and resources from the content management system 2. In response to this, the customer management system 2 responds by sending the requested resources including a page tag relating to the behavior analysis system. Subsequent to this, site usage information is sent by the browser 11 to the behavior analysis system 3. When the behavior analysis system 3 recognizes behavior that it has been configured to report to the content management system 2, the behavior analysis system 3 sends a script to the browser 11 to set a first party cookie providing monitoring information which can be considered as "hints" to the content management system 2. Then where there is subsequent communication between the browser 11 and the content management system 2, the request to the content management system 2 will include the first party cookie which, in effect, has been set up to include "hints" by the behavior analysis system 3. Then, in response to these "hints", the content management system 2, at its discretion, may use the hints to provide the user, using the client browser 11, with more pertinent content.

Figure 3:
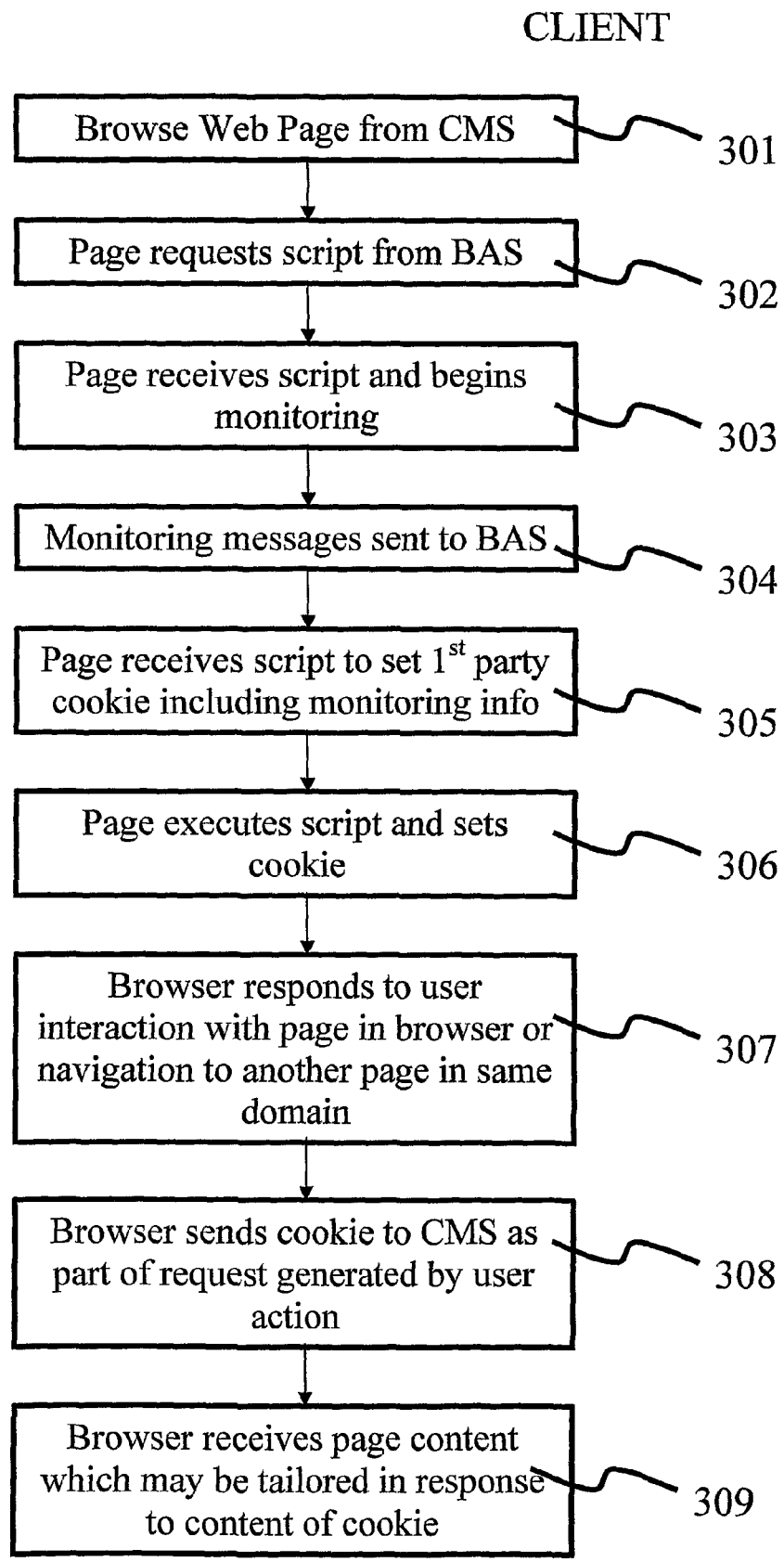
FIG. 3 is a flow chart showing the processes carried out at a client device during the operation of a method/system for providing tailored web pages.

FIG. 3 shows a flow chart of processes which occur within the client device 1 during the overall process described above. In step 301, the client device browses a web page from the content management system 2. In step 302, a page supplied from the content management system 2 and active in the browser requests script from the behavior analysis system 3. As a result of this, in step 303, the page within the browser receives the script and begins monitoring activity. In step 304, monitoring messages generated under control of the received script are sent to the behavior analysis system 3. At some point in time in step 305, the page may receive a script to set a first party cookie including monitoring information which has been determined by the behavior analysis system 3. In step 306, the page executes the script and sets the cookie which is a first party cookie as far as the content management system 2 is concerned. In step 307, as the user interacts with the page in the browser 11 or navigates to another page in the same domain the browser responds appropriately and this causes, in step 308, the browser 11 to send a request for another page or other content from the content management system 2. The first party cookie is sent along with this request. In step 309, the browser receives further page content or a new page which may be tailored in response to the content of the cookie sent to the content management system 2.

Figure 4:
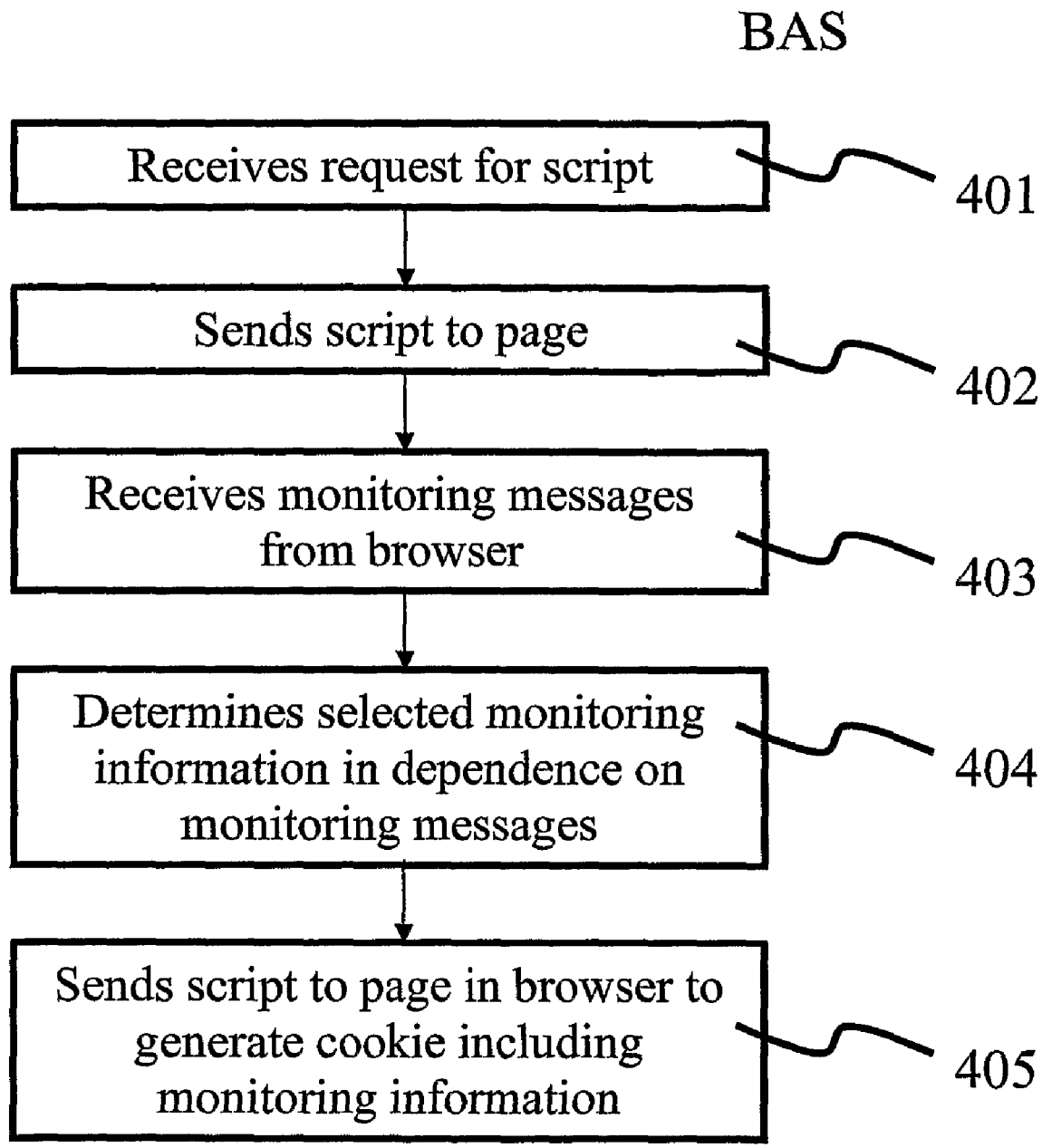
FIG. 4 is a flow chart showing the processes carried out at a behavioral analysis system server in a method/system for providing tailored web pages.

FIG. 4 shows a flow chart of processes which occur at the behavior analysis system 3 as part of the overall process described above. In step 401, the behavior analysis system 3 receives a request for monitoring script from a page in a browser 11. In step 402, the behavior analysis system 3 sends the appropriate script to the page. In step 403, the behavior analysis system receives monitoring messages from the browser and logs and analyses analyzes these monitoring messages as appropriate.

In step 404, the behavior analysis system 3 determines that there is selected monitoring information which may be of use to the content management system 2 in dependence on the information which has been received via the monitoring messages.

As a result of this, in step 405 the behavior analysis system 3 sends a script to the page in the browser 11 to generate a cookie including the selected monitoring information.

Figure 5:
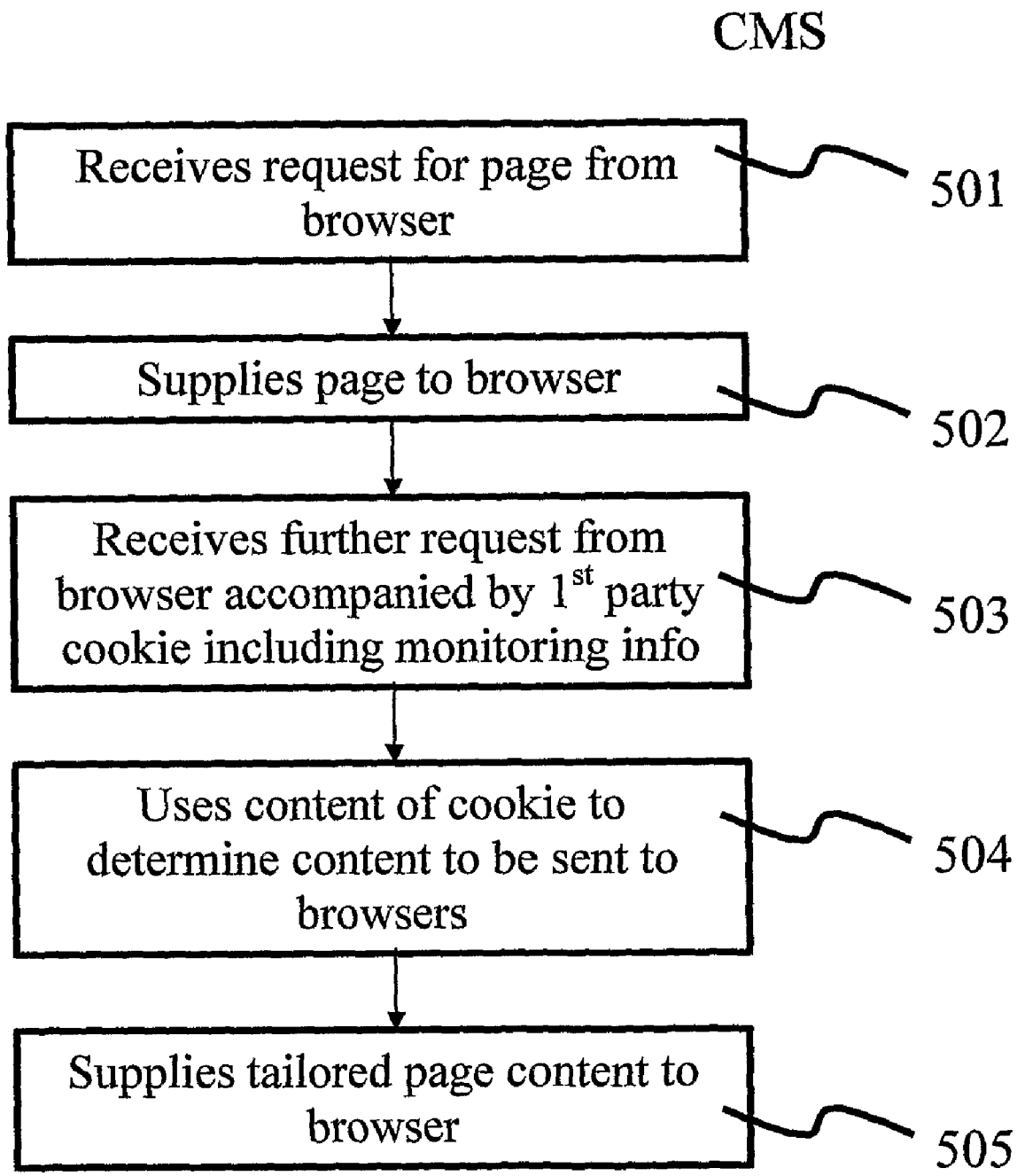
FIG. 5 is a flow chart showing the processes carried out at a content management system server in a method/system for providing tailored web pages.

FIG. 5 shows a flow chart of processes which take place in the content management system 2 as part of the overall process described above.

In step 501, the content management system 2 receives a request for a page from a browser 11 running in a client device 1.

In step 502, the content management system 2 supplies the appropriate page to the browser 11. This process of supplying pages in response to requests continues. At some point in time, the content management system 2 receives a further request from the browser 11 accompanied by a first party cookie including monitoring information which has been identified as potentially important by the behavior analysis system 3. In step 504, the content management system uses the content of the cookie to determine content to be sent to the browser 11. In step 505, the content management system 2 supplies tailored page content to the browser running in the client device 1.

It will be appreciated that in the present exemplary embodiments, although a client device 1 might often be a personal computer running a browser such as MS Internet Explorer, the exemplary embodiments will also function with the client device being any device 1 running a browser which is able to receive pages, makes use of HTTP or a similar protocol and can execute script to produce cookies which can accompany requests. Thus, for example, the client device might comprise an embedded browser and might comprise a set-top box, a mobile telephone or similar device having at least one digital data processor and associated memory configured to effect the described functionality.

It will be appreciated that the content management system and behavior analysis system may each comprise a plurality of computers/servers and thus there may be indirect or direct sending and receiving of messages between the page server and the client device and between the monitoring server and the client device. Moreover, some functions, analysis and processing of each system or each "server" may be carried out by different computers - the expressions system and "server" should be construed broadly to cover these possible arrangements. In some situations the content management system may run on the same machine or set of machines as the behavior analysis system.

It will be appreciated that the present exemplary embodiments may be embodied in a method as described above, a system as described above, a computer arranged under the control of software to operate as a client device as described above, a content management system as described above or a behavior analysis system as described above. The present exemplary embodiments may also be embodied in at least one computer program comprising code portions which are arranged to cause at least one computer to carry out a method described above and/or act as a system or apparatus as described above. The computer program may be carried on

The invention claimed is:

1. A method for receiving tailored pages within a browser running on a client device, the method comprising:
   using at least one programmed digital data processor in the client device to effect
   browsing, in a browser, pages from a page server;
   sending from an active page in the browser to a monitoring server, at least one monitoring message including information concerning at least one of (a) interactions with and (b) performance of at least one page browsed within the browser running on the respective client device;
   receiving in the active page, from the monitoring server, a control message including an instruction comprising a script for execution by the browser to generate a first party cookie within the browser in the domain of the active page including selected monitoring information;
   generating said first party cookie within the browser;
   sending a message to the page server, which message includes said first party cookie including the respective selected monitoring information; and
   receiving from the page server, at least one page content item selected in dependence on the selected monitoring information included in the first party cookie.

2. A method according to claim 1 which comprises, before the sending at least one monitoring message step, the step of the browser receiving a page from the page server that includes an instruction that causes the page to send a message to the monitoring server.

3. A method according to claim 2, in which the message, which the instruction is to cause to generate, comprises a request for a page component.

4. A method according to claim 2, in which the message, which the instruction is to cause to generate, comprises the monitoring message.

5. A method according to claim 1 in which each of the messages referred to above is an HTTP message, for example an HTTP request.

6. A method according to claim 1 in which a plurality of first party cookies are generated by each page.

7. A method according to claim 1 in which the control message includes instructions to generate more than one first party cookie.

8. A method according to claim 1 in which more than one control message is received in the active page, each control message including an instruction to generate one of a number of first party cookies.

9. A method according to claim 1 in which the page server is in a different domain than the monitoring server.

10. A client device comprising:
    at least one digital data processor and associated memory configured to be controlled by program logic to:
    receive tailored pages within a browser running on the client device:
    browse, in the browser, pages from a page server;
    send from an active page in the browser to a monitoring server, at least one monitoring message including information concerning at least one of (a) interactions with and (b) performance of at least one page browsed within the browser running on the respective client device;
    receive in the active page, from the monitoring server, a control message including an instruction comprising a script for execution by the browser to generate a first party cookie within the browser in the domain of the active page including selected monitoring information;
    generate said first party cookie within the browser;
    send a message to the page server, which message includes said first party cookie including the respective selected monitoring information; and
    receive from the page server, at least one page content item selected in dependence on the selected monitoring information included in the first party cookie.

11. A client device according to claim 10 in which the page server is in a different domain than the monitoring server.

12. A method for providing pages with tailored content to browsers running on client devices comprising:
    receiving at a monitoring server, from browsers running on client devices, monitoring messages including information concerning at least one of (a) interactions with and (b) performance of at least one page browsed within the browser running on the respective client device;
    determining selected monitoring information based on the monitoring messages received at the monitoring server;
    sending from the monitoring server, to active pages in the browsers, respective control messages including an instruction comprising a script for execution by the browser to generate a first party cookie within the browser in the domain of the active page including the respective selected monitoring information determined in the determining step;
    receiving at a page server, the first party cookies generated by the browsers including the respective selected monitoring information; and
    providing to the respective browsers at least one page content item selected in dependence on the selected monitoring information extracted from the respective first party cookie.

13. A method according to claim 12 in which the page server is in a different domain than the monitoring server.

14. A system comprising:
    at least one digital data processor and associated memory configured to provide pages with tailored content to browsers running on client devices,
    the system comprising a page server and a monitoring server configured to be under the control of program logic to:
    receive at the monitoring server, from browsers running on client devices,
    monitoring messages including information concerning at least one of (a) interactions with and (b) performance of at least one page browsed within the browser running on the respective client device;
    determine selected monitoring information based on the monitoring messages received at the monitoring server;
    send from the monitoring server, to active pages in the browsers, respective control messages including an instruction comprising a script for execution by the browser to generate a first party cookie within the browser in the domain of the active page including the respective selected monitoring information;
    receive at the page server, first party cookies generated by the browsers including the respective selected monitoring information; and
    provide to the respective browsers at least one page content item selected in dependence on the selected monitoring information extracted from the respective first party cookie.

15. A system according to claim 14 in which the page server is in a different domain than the monitoring server.

16. A system according to claim 14 in which the page server and the monitoring server run on the same digital data processor.

17. A system according to claim 14 in which at least one of the page server and the monitoring server comprise more than one digital data processor.

18. A system comprising:
at least one digital data processor and associated memory configured to provide pages with tailored content to browsers running on client devices,
the system comprising a page tailoring sub-system and a monitoring sub-system;
the monitoring sub-system comprising a receive module for receiving, from browsers running on client devices, monitoring messages including information concerning at least one of (a) interactions with and (b) performance of at least one page browsed within the browser running on the respective client device;
the monitoring sub-system comprising a determination module for determining selected monitoring information based on the monitoring messages received at the monitoring sub-system;
the monitoring sub-system comprising a send module for sending, to active pages in the browsers, respective control messages including an instruction comprising a script for execution by the browser to generate a first party cookie within the browser in the domain of the active page including the respective selected monitoring information;
the page tailoring sub-system comprising a receive module for receiving first party cookies generated by the browsers including the respective selected monitoring information; and
the page tailoring sub-system comprising a tailoring module for selecting for supply to the respective browsers at least one page content item selected in dependence on the respective selected monitoring information.

19. A system according to claim 18 in which the page server is in a different domain than the monitoring server.

20. A system according to claim 18 in which the page server and the monitoring server run on the same digital data processor.

21. A system according to claim 18 in which at least one of the page server and the monitoring server comprise more than one digital data processor.

22. A system according to claim 18 in which the monitoring sub-system comprises a monitoring server.

23. A method for setting first party cookies including monitoring information in browsers running on client devices comprising:
using at least one programmed digital data processor in each client device to effect
receiving at a monitoring system, from browsers running on client devices, monitoring messages including information concerning at least one of (a) interactions with and (b) performance of at least one page browsed within the browser running on the respective client device;
determining at the monitoring system selected monitoring information based on the monitoring messages received at the monitoring system;
sending from the monitoring system, to active pages in the browsers, respective control messages including an instruction comprising a script for execution by the browser to generate a first party cookie within the browser in the domain of the active page including the respective selected monitoring information determined in the determining step.

24. A method according to claim 23 in which the monitoring system comprises a monitoring server.

25. A method for providing pages with tailored content to a browser running on a client device comprising:
using at least one programmed digital data processor in a client device to effect
receiving at a monitoring server, from a browser running on a client device, at least one monitoring message including information concerning at least one of (a) interactions with and (b) performance of at least one page browsed within the browser running on the client device;
determining selected monitoring information based on the monitoring message received at the monitoring server;
sending from the monitoring server, to an active page in the browser, a control message including an instruction comprising a script for execution by the browser to generate a first party cookie within the browser in the domain of the active page including the selected monitoring information determined in the determining step;
receiving at a page server, the first party cookie generated by the browser including the selected monitoring information; and
providing to the browser at least one page content item selected in dependence on the selected monitoring information extracted from the first party cookie.

26. A method according to claim 25 in which the page server is in a different domain than the monitoring server.

* * * * *